(12) United States Patent
Riise et al.

(10) Patent No.: US 7,752,210 B2
(45) Date of Patent: Jul. 6, 2010

(54) METHOD OF DETERMINING GEOGRAPHICAL LOCATION FROM IP ADDRESS INFORMATION

(75) Inventors: Soren Riise, Ruislip (GB); Devesh Patel, Ruislip (GB)

(73) Assignee: Yahoo! Inc., Sunnyvale, CA (US)

( * ) Notice: Subject to any disclaimer, the term of this patent is extended or adjusted under 35 U.S.C. 154(b) by 693 days.

(21) Appl. No.: 10/745,094

(22) Filed: Dec. 22, 2003

(65) Prior Publication Data

US 2005/0108244 A1    May 19, 2005

(30) Foreign Application Priority Data

Nov. 13, 2003 (GB) .................. 0326488.4
Nov. 13, 2003 (GB) .................. 0326489.2

(51) Int. Cl.
*G06F 17/30* (2006.01)
*G06F 7/00* (2006.01)

(52) U.S. Cl. .................................................. 707/755

(58) Field of Classification Search ........................ None
See application file for complete search history.

(56) References Cited

U.S. PATENT DOCUMENTS

| | | | | |
|---|---|---|---|---|
| 5,978,747 | A * | 11/1999 | Craport et al. | 702/150 |
| 6,665,715 | B1 * | 12/2003 | Houri | 709/223 |
| 7,136,932 | B1 * | 11/2006 | Schneider | 709/245 |
| 7,249,175 | B1 * | 7/2007 | Donaldson | 709/225 |
| 7,472,163 | B1 * | 12/2008 | Ben-Yoseph et al. | 709/206 |
| 2002/0082960 | A1 * | 6/2002 | Goedken | 705/35 |
| 2002/0129011 | A1 * | 9/2002 | Julien | 707/3 |
| 2003/0065571 | A1 * | 4/2003 | Dutta | 705/26 |
| 2003/0093438 | A1 | 5/2003 | Miller | |
| 2003/0125909 | A1 * | 7/2003 | Wen et al. | 702/188 |
| 2004/0189693 | A1 * | 9/2004 | Kenig | 345/736 |
| 2004/0249895 | A1 * | 12/2004 | Way | 709/206 |
| 2005/0076139 | A1 * | 4/2005 | Jinmei et al. | 709/245 |
| 2005/0251539 | A1 * | 11/2005 | Parekh et al. | 707/200 |

FOREIGN PATENT DOCUMENTS

| | | |
|---|---|---|
| CA | 2318669 | 3/2002 |
| WO | WO 01/58111 A1 | 8/2001 |

OTHER PUBLICATIONS

Proceedings of ACM SIGMOD Workshop on the Web and Databases (WebDB'99), Jun. 1999, O Buyukkoten et al., Exploiting Geographical Location Information of Web Pages, Available from http://www1.cs.columbia.deu/~gravano/Papers/1999/webdb.ps [Accessed Nov. 10, 2004] see p. 2 Section 2: Computing Geographical Scopes.

* cited by examiner

*Primary Examiner*—Charles Rones
*Assistant Examiner*—Alicia M Lewis
(74) *Attorney, Agent, or Firm*—Hancock Hughey LLP

(57) ABSTRACT

A method of determining a geographical location from IP address information comprising: interrogating a database of IP address information mapped to domain name information by submitting a given IP address; the database returning a domain name in response to the given IP address; deriving one or more likely web site addresses from the domain name; and scanning the or each derived web site address for geographical address information to determine likely geographical address information.

1 Claim, 1 Drawing Sheet

METHOD OF DETERMINING GEOGRAPHICAL LOCATION FROM IP ADDRESS INFORMATION

TECHNICAL FIELD

This invention relates to a method of determining a geographical location from IP address information.

BACKGROUND

The following terms are used in this specification and have the following meaning:

| Term | Meaning |
| --- | --- |
| C-Class network address | An IP address block consisting of 256 consecutive addresses |
| DNS | Directory Name Service. The naming services used on the internet to map between symbolic names (www.example.com) and IP addresses. |
| Geocode | The process of taking geographical address information, such as a street level address and translating it into a precise longitude and latitude. |
| Geocoding Resolution | The precision of the geocoding, such as street level, town province or zip/postal-code. Each level of geocoding offers better absolute precision and to the margin of error. |
| IP address | Internet Protocol Address (either IPv4 or IPv6) - the address system allowing internet applications to communicate. |
| IPv4 | Original IP addressing, using 32 bits for the address. |
| IPv6 | New improved IP addressing scheme, using 128 bits for the address |
| ISP | Internet Service Provider |
| Longitude-latitude | An addressing system for describing a position anywhere on the globe. |
| Reverse DNS | The DNS service which allows one to retrieve a domain name given an IP ddress. |
| PIPE/ARIN | Organisations responsible for allocating IP addresses globally. The responsibility is divided between 4 organisations, RIPE for Europe, ARIN for America, APNIC for Asia Pacific, LACNIC for Latin America |
| Triangulation | The process of determining a location by some measurements obtained from multiple other known locations. |

A number of Internet applications such as advertising using banners or paid listings depend on the ability to position the user in a geographical context. Due to the way the internet functions, majority access being largely anonymous, the most relevant piece of information that an application has to rely on to determine a geographic location is the IP address of the connecting user.

There are a number of existing methods for determining the approximate geographical locations of IP addresses. The RIPE/ARIN IP organisations maintain a database of the IP Ranges allocated to specific continents, countries and Internet Service Providers (ISPs). Some known methods of incremental improvements beyond this base data are:

Looking at the "Traceroute" information for individual IP addresses. "Traceroute" provides the ISP assigned names for the routers leading up to the terminating IP address. Many ISPs assign names which provide their support staff with an indication of the physical and geographical location of the routing equipment meaning that state, city, suburb or airport codes are therefore typically included in the name chosen for the router. There is however no agreed standard for such naming, and hence each ISP uses their own standard which needs to be known, derived or second guessed by an observer.

Looking at the transmission time (ping-time) between well known geographical locations and an IP address being investigated. The concept is that with the use of triangulation it is possible to determine the IP address location, assuming that the transmission time is a measure of direct distance between the known location and the IP address being pinged. This assumption is only correct in a well connected and well maintained network where there are little or no delays in transmission times (or consistent delays in transmission times over the respective transmission lines between the known location and the IP address being pinged. Despite the fact that the Internet is constantly developing better connectivity this method fails when two near-by points connecting via a remote point (e.g. London to Paris via New York).

Data mining from specialist sites. A number of specialist sites (TV listings, Online Car Shopping, Online Dating, etc.) require a user to enter post code information, or similar which defines a limited geographical area to which the user's IP address can be mapped.

These approaches are limited by the constraints that they can only provide a best estimate of the geographical location of a user's IP address down to a city or suburb level and they assume that all IP addresses are of equal importance.

SUMMARY OF THE INVENTION

It is an object of the present invention to seek to provide a better method to determine the geographical location with better resolution for certain IP addresses allocated to a proxy server/router/gateway.

Accordingly, one aspect of the present invention provides a method of determining a geographical location from IP address information comprising: interrogating a database of IP address information mapped to domain name information by submitting a given IP address; the database returning a domain name in response to the given IP address; deriving one or more likely web site addresses from the domain name; and scanning the or each derived web site address for geographical address information to determine likely geographical address information.

Another aspect of the present invention provides a system for determining a geographical location from IP address information comprising: an interrogation unit to interrogate a database of IP address information mapped to domain name information by submitting a given IP address and to return a domain name in response to a given IP address; a unit operable to derive one or more likely web site addresses from the domain name; and a scanner to scan the or each derived web site address for geographical address information to determine likely geographical address information.

Conveniently, the method includes the step of geocoding the geographical address information to provide an accurate longitude and latitude for that geographical address.

Advantageously, the method comprises repeating the method for a plurality of IP addresses.

Preferably, the method comprises building a database of IP addresses and a record of at least one of the group consisting of: a Domain Name corresponding to the IP address; a likely web site address; geographical address information derived from the web site; and the longitude and latitude information geocoded from the geographical address information.

Conveniently, the given IP address is selected from a group of IP addresses used for web access.

BRIEF DESCRIPTION OF THE DRAWINGS

In order that the present invention may be more readily understood, embodiments thereof will now be described, by way of example, with reference to the accompanying drawings, in which.

DETAILED DESCRIPTION

The invention provides a method which allows the refinement of the geographical location for certain IP addresses down to the resolution of a postal address level.

The method exploits the features of the pervading IT infrastructure where internet access is via a few IP addresses registered to a proxy server or router/firewall. The typical IT infrastructure of many local offices, such as business and universities, across the world usually involves a single geographical location with internet access from a few IP addresses registered for their use.

There are a number of commercially available applications for IP address location mapping which allow the majority of IP address to be located to the resolution of a city or a country level. However, it would be beneficial to many internet applications to have better resolution, if only for some IP address, as not all IP addresses are equally important. It should be noted that a significant amount of web browsing is done from the work place from where it is possible to map a user's location down to the actual postal address of the company work place.

The present invention exploits some of the following features, namely that:

1) IP addresses are not all equally "important". Most office IT infrastructures use a shared gateway to the internet (whether a proxy server or a router) which hides the true internal IP address of the client, only exposing one (or at least very few) IP addresses assigned to the company. The IP address of the internet gateway for such an infrastructure is more important than any other IP address assigned to the company. The search space of IP addresses in, for example IPv4 can be dramatically reduced from the approximately 4 billion (2 to the power of 32) possible IP addresses in the IPv4 to a fraction less than a million by gathering statistics on which IP addresses are actually used for web access.
2) it is noted that most businesses have a web page that contains contact information and driving instructions; and
3) it is further noted that most businesses with a high level of computer users operate their own mail server, or other service that requires in-bound connectivity, and hence are likely to have their respective domain name associated with at least some of the IP addresses.

In the following example of a system and method embodying the present invention, source information comprises an IP address and the method operates upon the source information to provide an accurate geographical location down to street level address resolution of the equipment associated with the given IP address.

Figure 1:
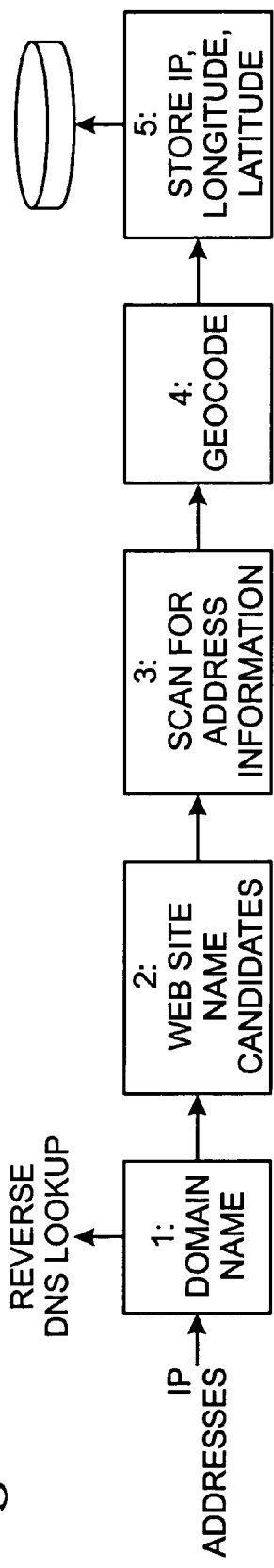
FIG. 1 is a schematic block diagram of a method embodying the present invention.
Figure 2:
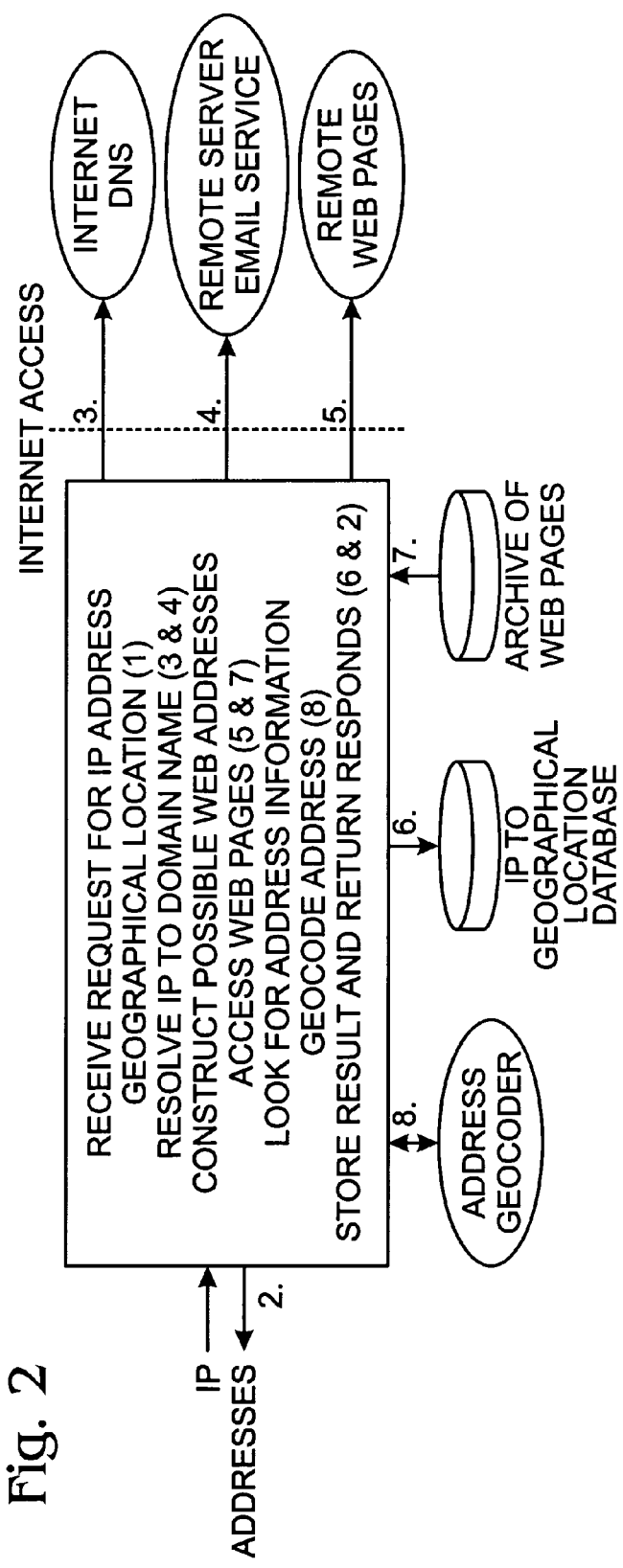
FIG. 2 is a schematic block diagram of a system embodying the present invention.

The construction of the system involves a computer system as shown in FIG. 2 with a connection to the Internet or other network. The computer has disk storage 1 for the accumulation of data, and an interface 2 for requesting analysis of a given IP address. The interface is either provided as an interface over the internet, a local screen, or similar data entry form. The computer system has access to DNS services 3 across the internet, and is able to access web pages using the HTTP protocol 5, likewise across the internet. In an alternative implementation, the Web pages may be accessible from internal storage 7 where the pages have been retrieved at an earlier stage.

An IP address requested for analysis is received over the interface 1 as described above. The system starts by accessing the DNS service 3 to perform a Reverse DNS lookup. The Reverse DNS lookup will either provide an Domain Name, or an error indicating no domain name is associated with the IP address.

If an error is received, alternative means such as trying to contact the IP address using the SMTP (email) port 4, which, if configured, typically includes the domain name of the server in the first responds line.

Once the domain name have been provided it will be broken up and reformatted into possible web page addresses. Each of these addresses are then attempted accesses 5 to check if they contain web pages containing a contact address. The contact address is then collected and by using standard geocoding software 8 translated to a precise longitude/latitude.

The geographical address and IP address is then stored 6 for future reference (cache or other usage), and a response is returned to the original requester 2.

Thus, starting with the source information of an IP address such as 123.213.132.123, the method firstly involves an interrogation of the Directory Name Service or an equivalent database containing mapped IP address and corresponding Domain Name/symbolic name information, this step can be referred to as a reverse DNS look-up. The interrogation of the DNS service returns a domain name in response to the given IP address.

Having retrieved the domain name (e.g. mypc.myoffice.example.com), the web site address is derived therefrom by stripping and replacing the front part of the domain name with a commonly used name for web sites (e.g. www). In the present example where the domain name has a number of components, multiple attempts at deriving the web site address are made so the following would be identified as likely web site addresses associated with the given IP address:

www.mypc.myoffice.example.com;
www.myoffice.example.com; and
www.example.com.

The site of each of the derived web site addresses is then scanned for address information, driving directions and the like so as to determine geographical address information including a street level address for the given IP address.

Any address information derived from the one or more web sites is geocoded to provide an accurate longitude and latitude for that location.

The longitude and latitude information is then paired with the given IP address and stored for internet application use in a database maintained for that purpose.

The process is used repetitively to build a database of the most important IP addresses and their corresponding longitude and latitude information. The database can also hold the information gathered at intermediate stages in the process outlined above so that for any IP address which is subjected to the process, there will be a record of the corresponding Domain Name, likely web site addresses, geographical address information derived from the web site(s) and the longitude and latitude information geocoded from the geographical address information.

The invention can be configured as a computer program comprising computer program code means adapted to perform the relevant steps when said program is run on a computer. Further, said computer program can be stored on a computer readable medium such as a disk, CD-ROM, memory, etc.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A computer readable medium having computer program code for carrying out a method of determining a geographical location from IP address information, the method comprising:

interrogating a database of IP address information mapped to domain name information by submitting a given IP address;

the database returning either a domain name or an error in response to the given IP address;

deriving one or more web site addresses from a returned domain name;

interrogating a SMTP port of the IP address in instances where an error is returned;

deriving one or more web site addresses in response to the SMTP port interrogation; and scanning one or more web pages of the or each derived web site address for geographical address information to determine geographical address information.

* * * * *